United States Patent
Buddendick et al.

(10) Patent No.: US 11,789,139 B2
(45) Date of Patent: Oct. 17, 2023

(54) METHOD AND DEVICE FOR DETECTING CRITICAL TRANSVERSE MOVEMENTS USING CW AND FMCW RADAR MODES

(71) Applicant: Robert Bosch GmbH, Stuttgart (DE)

(72) Inventors: Hermann Buddendick, Sindelfingen (DE); Stephan Morgen, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 651 days.

(21) Appl. No.: 16/958,667

(22) PCT Filed: Nov. 22, 2018

(86) PCT No.: PCT/EP2018/082299
§ 371 (c)(1),
(2) Date: Jun. 26, 2020

(87) PCT Pub. No.: WO2019/141415
PCT Pub. Date: Jul. 25, 2019

(65) Prior Publication Data
US 2021/0373146 A1 Dec. 2, 2021

(30) Foreign Application Priority Data
Jan. 18, 2018 (DE) .................. 102018200757.8

(51) Int. Cl.
*G01S 13/58* (2006.01)
*G01S 13/32* (2006.01)
(Continued)

(52) U.S. Cl.
CPC ....... *G01S 13/589* (2013.01); *B60W 30/0956* (2013.01); *B60W 60/0015* (2020.02);
(Continued)

(58) Field of Classification Search
CPC ........ G01S 13/589; G01S 13/32; G01S 13/58; G01S 13/583; G01S 13/931;
(Continued)

(56) References Cited

U.S. PATENT DOCUMENTS 3,737,902 A * 6/1973 O'Hagan ............... G06F 3/0362
342/107
6,085,151 A * 7/2000 Farmer ................. G01S 7/0234
701/96
(Continued)

FOREIGN PATENT DOCUMENTS

DE 19638387 A1 3/1998
DE 102004024706 A1 12/2005
(Continued)

OTHER PUBLICATIONS

International Search Report for PCT/EP2018/082299, dated Feb. 22, 2019.

*Primary Examiner* — Donald H B Braswell
(74) *Attorney, Agent, or Firm* — NORTON ROSE FULBRIGHT US LLP; Gerard Messina (57) ABSTRACT

A method for detecting critical transverse movements. The method includes the following steps: emitting a CW radar signal and generating radar data based on the received reflected CW radar signal with the aid of a radar device; ascertaining collision-relevant spectral ranges of the radar data as a function of an ego velocity of the radar device; ascertaining a time dependency of a relative velocity and of an object angle of an object by evaluating the radar data in the ascertained spectral ranges; and detecting a critical transverse movement of the object using the time dependency of the relative velocity and of the object angle of the object.

11 Claims, 5 Drawing Sheets

(51) Int. Cl.
  *G01S 13/931* (2020.01)
  *B60W 60/00* (2020.01)
  *B60W 30/095* (2012.01)

(52) U.S. Cl.
  CPC .............. *G01S 13/32* (2013.01); *G01S 13/58* (2013.01); *G01S 13/583* (2013.01); *G01S 13/931* (2013.01); *B60W 2420/52* (2013.01); *B60W 2554/404* (2020.02); *B60W 2554/80* (2020.02); *G01S 2013/93185* (2020.01); *G01S 2013/93271* (2020.01)

(58) Field of Classification Search
  CPC . G01S 2013/93185; G01S 2013/93271; G01S 2013/9321; B60W 30/0956; B60W 60/0015; B60W 2420/52; B60W 2554/404; B60W 2554/80
  See application file for complete search history.

(56) References Cited

U.S. PATENT DOCUMENTS

| | | | |
|---|---|---|---|
| 2006/0187112 A1* | 8/2006 | Nalezinski | G01S 13/34 342/118 |
| 2008/0291078 A1* | 11/2008 | Hilsebecher | B60R 21/0134 342/70 |
| 2015/0353081 A1* | 12/2015 | Kaminade | B60W 30/08 701/1 |
| 2018/0372860 A1* | 12/2018 | Baba | G01S 13/867 |
| 2019/0001973 A1* | 1/2019 | Matsunaga | B60T 7/12 |
| 2019/0137601 A1* | 5/2019 | Driscoll | G01S 13/931 |

FOREIGN PATENT DOCUMENTS

| | | | |
|---|---|---|---|
| DE | 102013018310 A1 | 4/2015 |
| EP | 2068173 A1 | 6/2009 |

\* cited by examiner

METHOD AND DEVICE FOR DETECTING CRITICAL TRANSVERSE MOVEMENTS USING CW AND FMCW RADAR MODES

FIELD

The present invention relates to a method for detecting critical transverse movements and to a device for detecting critical transverse movements. The present invention further relates, in particular, to a corresponding device for a vehicle or for a driver assistance system of a vehicle.

BACKGROUND INFORMATION

Modern vehicles typically have radar devices that monitor a certain surrounding area of the vehicle. Based on the generated radar data, it is possible to identify objects in the surroundings of the vehicle and the driver of the vehicle may be warned of collision critical situations in a timely manner. It is further possible to autonomously control particular vehicle functions on the basis of the radar data. An emergency braking, in particular, may be initiated upon identification of an intersecting obstacle.

Radar devices that include various transmission antennas which have different detection ranges, are conventional. A relatively narrow far range field of view may, for example, be monitored with the aid of a first antenna, while a wider close-up range field of view is monitored with the aid of a second antenna.

The use of different modulation methods is conventional. Thus, German Patent Application No. DE 10 2004 024 706 A1 describes a radar sensor for motor vehicles for avoiding collisions or for reducing the severity of collisions, radar radiation being emitted in at least two or more different modulation modes.

One conventional method is the CW modulation (continuous wave), in which a radar signal having a constant amplitude and constant frequency is emitted. The received reflected radar signal has a frequency that differs from the frequency of the emitted radar signal. The frequency difference is a function of the relative velocity of the observed object. The CW modulation makes it possible to determine the relative velocity with a high degree of accuracy in the range of up to 0.1 meters per second.

A further conventional modulation method is the frequency modulated continuous wave modulation or FMCW modulation. In this case, a radar signal having a variable frequency is emitted, so that it is possible to determine both the velocity as well as the distance of the investigated object by measuring the reflected radar signal. However, the accuracy of the velocity determination is typically lower than in the case of a CW modulation.

SUMMARY

The present invention provides a method and a device.

According to a first aspect, the present invention accordingly relates to a method for detecting critical transverse movements. In accordance with an example embodiment of the present invention, a radar device emits a CW radar signal and generates radar data based on the received reflected CW radar signal. Collision-relevant spectral ranges are ascertained as a function of the ego velocity of the radar device. A time dependency of a relative velocity and of an object angle of an object is ascertained by evaluating the radar data in the ascertained collision-relevant spectral ranges. A critical transverse movement of the object is detected using the time dependency of the relative velocity and of the object angle of the object.

According to a second aspect, the present invention accordingly relates to a device for detecting critical transverse movements exhibited by a radar device designed to emit a CW radar signal and to generate radar data based on the received reflected CW radar signal. In accordance with an example embodiment of the present invention, the device further includes a computing device, which is designed to ascertain collision-relevant spectral ranges of the radar data as a function of an ego velocity of the radar device. The computing device evaluates the radar data in the ascertained spectral ranges in order to ascertain a time dependency of a relative velocity and of an object angle of an object. The computing device is further designed to detect a critical transverse movement of the object using the time dependency of the relative velocity and of the object angle of the object.

Preferred specific embodiments of the present invention are described herein.

Example embodiments of present invention make use of the aforementioned exact velocity resolution of CW-modulated radar signals. According to the present invention, it is possible, based already on the CW radar signal itself, to detect whether an object executes a critical transverse movement without a precise distance determination. A critical transverse movement in this case is understood to mean that the object moves along an object trajectory toward the trajectory of the radar device, a collision to be expected or being likely. A transverse movement thus describes generally intersecting trajectories, the enclosed angle not necessarily having to be 90°.

The method is advantageously independent of the type of the objects. Thus, pedestrians may be just as readily identified as bicyclists, motorcyclists or other vehicles.

According to one preferred refinement of the method according to the present invention, the radar device includes a plurality of antenna devices having detection ranges that differ from one another. The activation of the antenna devices is a function of whether or not a critical transverse movement of the object is detected. With the aid of the antenna devices, it is possible to carry out a more precise analysis, in particular, of a temporal course of the distance and of the velocity of the object.

According to one refinement of the method according to the present invention, at least one of the antenna devices is activated to emit a FMCW radar signal in the event a critical transverse movement of the object is detected. A movement of the object is more precisely determined based on the received reflected FMCW radar signal. The antenna devices may include, for example, a first antenna device having a narrower far range field of view and a second antenna device having a wider close-up range field of view. In the event an intersecting object is identified, the second antenna device may be activated, for example, in order to track more precisely the object in the wide close-up range field of view. The first antenna device may also be activated as a function of the object angle in the event the object is situated in the far range field of view. In this way, it is possible to specifically track the movement of the object already in an early stage. By switching to the most favorable viewing range depending on the situation, it is possible to optimally monitor the object. Based on the movement of the object ascertained with the aid of the FMCW radar signals, it is possible to precisely check whether in fact a collision with the object is likely. In this case, a warning may be output to the driver or an emergency braking may be activated. The pieces of information detected with the aid of the CW radar signal may be used for purposes of classification. In this way, the pieces of surroundings information are optimally evaluated. The analysis of the CW radar signal according to this specific embodiment represents a pre-filtering, which is used to already identify preferably all critical trajectories, but at the same time to generate preferably few false reports. In this way, it is possible to avoid a frequent switching into the wider close-up range mode, which increases the efficiency of the device. Central area functions, in particular, are limited to a lesser degree.

According to one preferred refinement of the method according to the present invention, the radar device includes a plurality of receiver units, the object angle being calculated based on phase differences of the reflected CW radar signal received by various receiver units. Four receiver units may be provided, for example, which are situated along the front of the vehicle. By comparing the phase differences, it is typically possible to determine already relatively precisely the object angle.

According to one preferred refinement of the method according to the present invention, the collision-relevant spectral ranges are determined in such a way that only objects having a negative relative velocity are considered. Aside from nearly parallel movements of the object which, however, represent a lesser danger, objects, which may collide with the radar device, invariably exhibit a negative relative velocity. Already limiting the spectral range to be investigated for evaluation greatly reduces the computing time. A disadvantageous influence by stationary targets, in particular, is omitted.

According to one preferred refinement of the method according to the present invention, the collision-relevant spectral ranges are determined under the assumption that the ego velocity of the radar device, the relative velocity of the object, and the object angle of the object are constant. Thus, a linear trajectory of the object and a linear trajectory of the radar device are preferably ascertained, assuming that the velocities of object and vehicle do not change, which is an appropriate assumption at least on short time scales. The constancy of the relative velocity and of the object angle result from the collision condition using the intercept theorem, which is known as a constant bearing.

According to one refinement of the method according to the present invention, collision-critical relative velocities and corresponding collision-critical object angles are determined as a function of the ego velocity of the radar device, as a function of an intersecting angle between a trajectory of the object and a trajectory of the radar device, and as a function of an object velocity of the object. The collision-relevant spectral ranges are limited to collision-critical ego velocities and collision-critical object angles, which correspond to the ego velocity of the radar device, to a predefined range of the intersecting angle and to a predefined range of the object velocities. Such a correlation may be derived using the collision condition based on geometrical considerations. The exact correlation may, for example, be stored in a look-up table, so that the device is able to rapidly and simply determine the corresponding collision-critical relative velocities and collision-critical object angles as a function of the ego velocity and of the predefined range of the intersecting angles or of the object velocities.

The collision condition for punctiform radar devices and punctiform objects corresponds to the condition of an intersection point of the trajectory of the radar device and of the trajectory of the object at a particular future point in time. However, the collision-critical relative velocities and collision-critical object angles are preferably further determined taking finite expansions of the object and of the vehicle that includes the radar device into consideration. Thus, the collision condition may take corresponding tolerance ranges into consideration, i.e., the relative velocities and object angles are determined in a certain range around the values ascertained for the punctiform radar devices and punctiform objects.

According to one preferred refinement of the method according to the present invention, a critical transverse movement of the object is detected in the event relative changes of the relative velocity and of the object angle do not exceed predefined threshold values. The transverse movement is thus identified precisely in the event the relative velocity and the object angle remain essentially constant, thus, the object moves toward a collision point with the radar device according to the aforementioned constant bearing.

BRIEF DESCRIPTION OF THE DRAWINGS

In all figures, identical or functionally identical elements and devices are provided with the same reference numerals.

DETAILED DESCRIPTION OF EXAMPLE EMBODIMENTS

Figure 1:
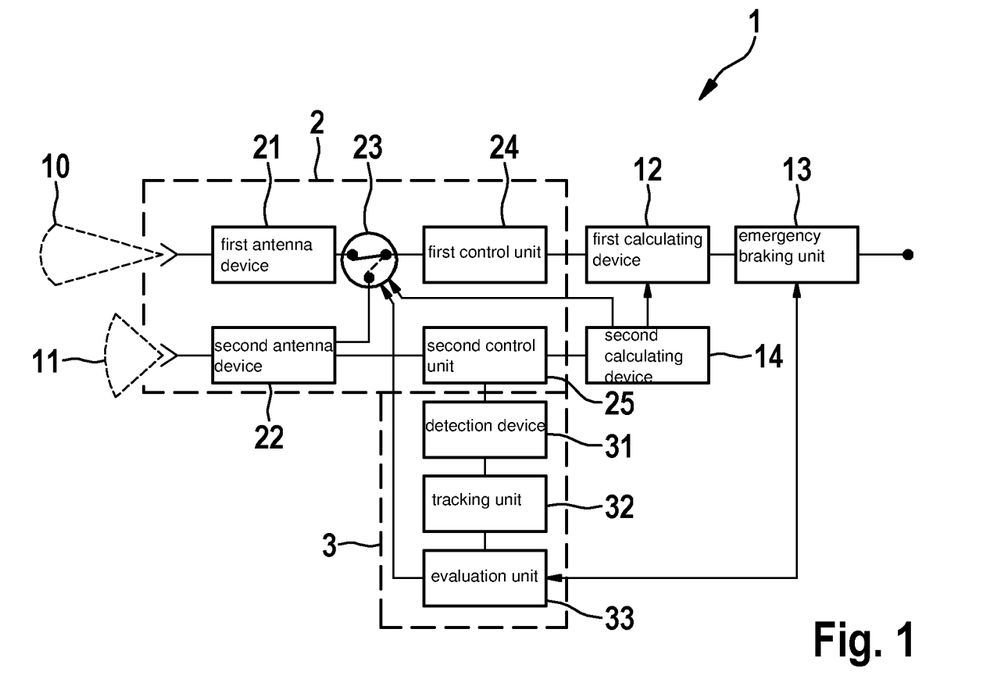
FIG. 1 schematically shows a block diagram of a device according to one specific embodiment of the present invention.

FIG. 1 shows a block diagram of a device 1 for detecting critical transverse movements, in accordance with an example embodiment of the present invention. Device 1 includes a first antenna device 21 having a narrow far range field of view 10 and a second antenna device 22 having a wide close-up range field of view 11. Antenna devices 21, 22 each include at least one transmitting antenna for emitting a radar signal and a plurality of receiver antennas for receiving the reflected radar signal. According to some specific embodiments, the antennas may be designed both for emitting radar signals as well as for receiving radar signals.

First antenna device 21 or second antenna device 22 may alternatively be operated via a switching device 23. A first control unit 24 may activate antenna device 21, 22 for emitting a FMCW-modulated radar signal and may evaluate the received FMCW modulated reflected radar signal.

A second control unit 25 is coupled to second antenna device 22 and activates this antenna device to emit a CW-modulated radar signal. Second control unit 25 is further designed to generate radar data based on the received CW-modulated radar signal and to transmit them to a computing device 3 for evaluation. Antenna devices 21, 22, switching device 23, first control unit 24 and second control unit 25 constitute a radar device 2 of device 1.

Computing device 3 includes a detection device 31, which initially ascertains collision-relevant spectral ranges of the radar data. For this purpose, detection device 31 receives the value of the ego velocity of radar device 1, determined by a sensor device not shown, which may correspond, in particular, to an ego velocity of a vehicle that includes radar device 1. The determination of the relevant spectral ranges is explained in greater detail with reference to the following figures.

Figure 2:
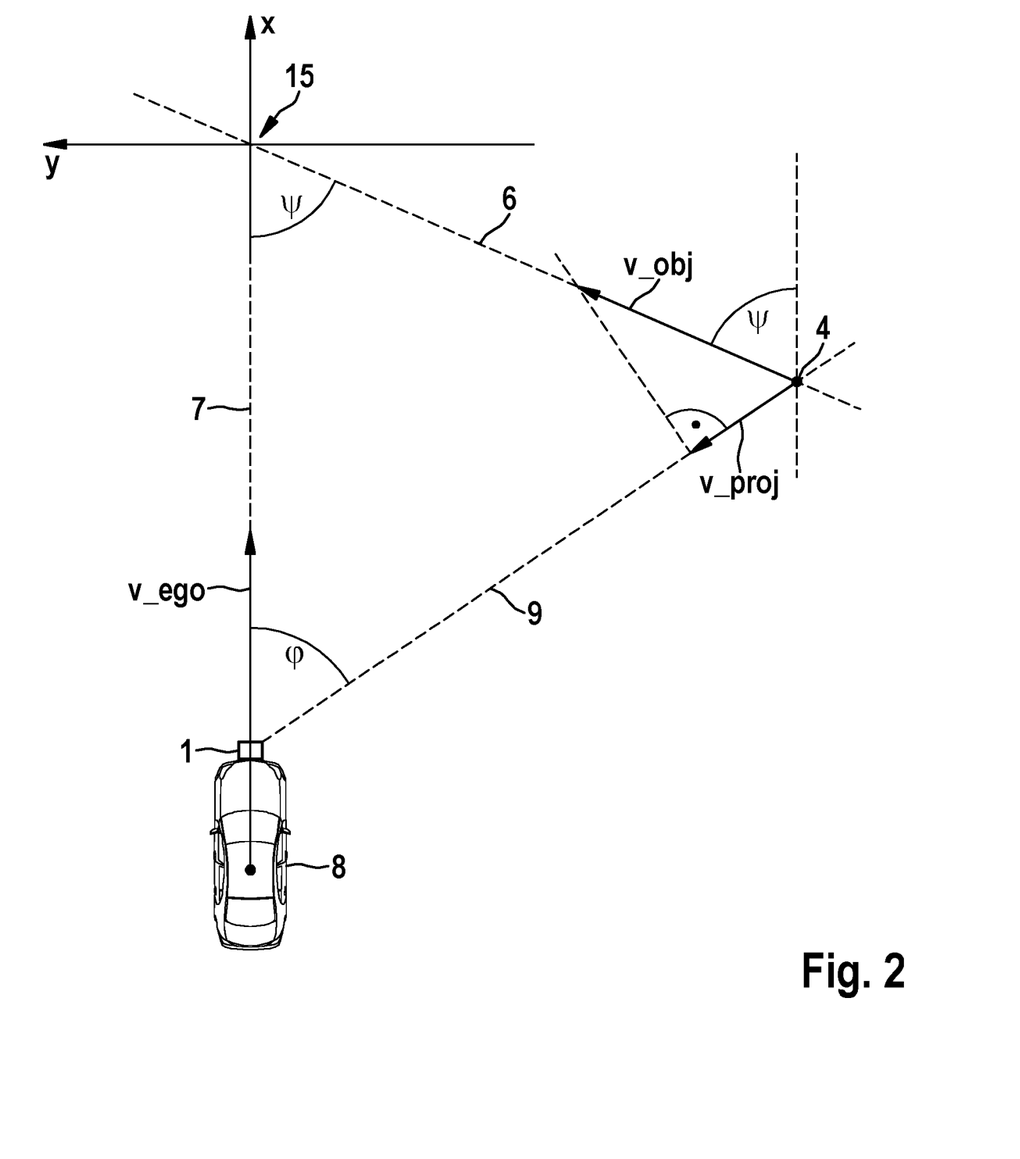
FIG. 2 schematically shows a top view of a vehicle including a device and an object for explaining a possible collision.

FIG. 2 schematically shows a top view of a vehicle 8 including device 1, an object 4 being situated in a surroundings of vehicle 8. Object 4 may, for example, be a pedestrian, a bicyclist or another vehicle. Vehicle 8 moves at ego velocity v_ego along a straight vehicle trajectory 7, which defines an x-axis and a y-axis perpendicular thereto. The main radiation direction of radar device 2 also extends along the x-axis, however, the present invention is not limited to radar devices 2 aligned in this manner. Object 4 appears at an object angle or azimuth angle φ relative to the x-axis and moves at an object velocity v_obj along an object trajectory 6 toward a collision point 15. Object trajectory 6 and vehicle trajectory 7 intersect at collision point 15 at an intersecting angle ψ. To derive the measurable relative velocity v_rad of object 4, it is necessary to use the projection v_proj of object velocity v_obj on a connecting line 9 between device 1 and object 4.

In the event ego velocity v_ego of vehicle 8 and object velocity v_obj are selected in such a way that vehicle 8 is situated on a collision course with object 4, then neither relative velocity v_rad nor object angle φ change over time.

Figure 3:
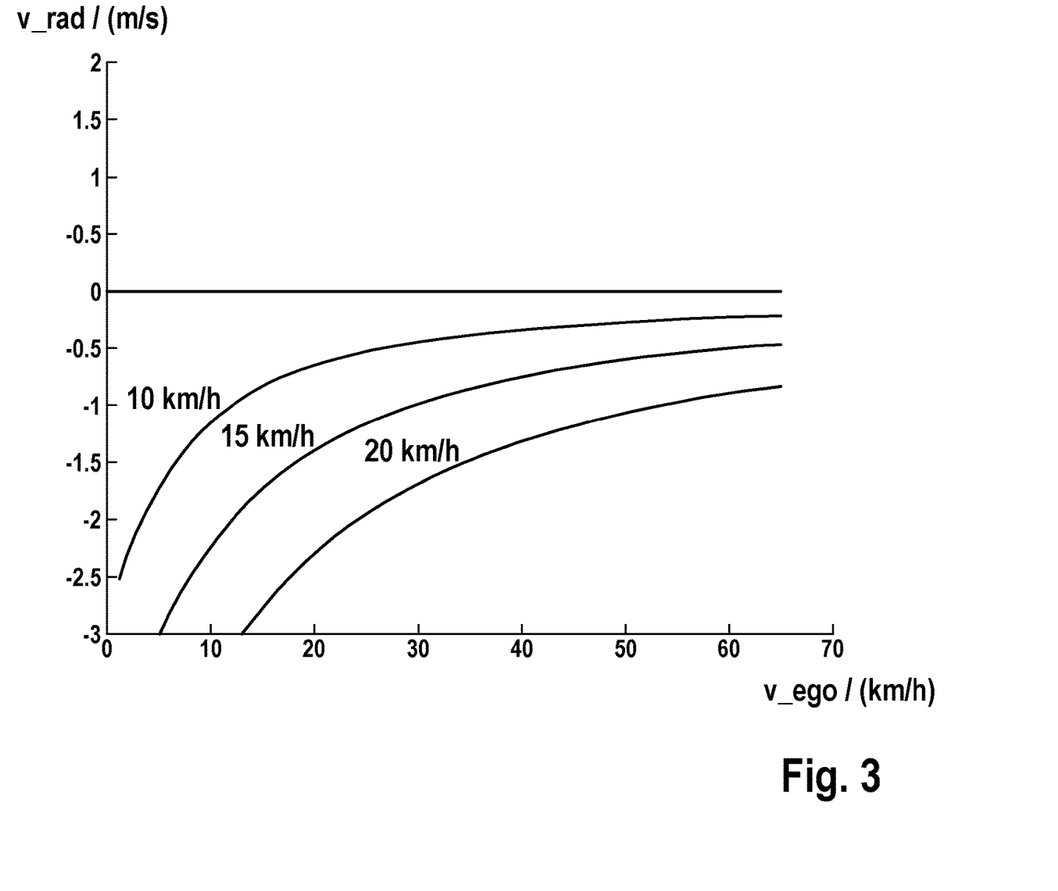
FIG. 3 shows dependencies of the relative velocity on the vehicle velocity for various object velocities of the object.

FIG. 3 illustrates the relative velocities of a perpendicularly intersecting object as a function of ego velocity v_ego of vehicle 8 for three different object velocities v_obj of 10 km/h, 15 km/h and 20 km/h.

Based on geometrical considerations, it is possible to derive the following correlation between relative velocity v_rad, of object velocity v_obj, of ego velocity v_ego of vehicle 8, object angle φ and intersecting angle ψ:

$$v_{rad} = v_{obj} \cos(\varphi - \psi) + v_{ego}(1 - \cos \varphi)$$

In the event object 4 and device 1 are situated on a collision course, it is also possible to derive the following relationships:

$$\frac{-\sin \varphi}{v_{obj}} = \frac{\sin(90° + \varphi + 90° - \varphi)}{v_{ego}}$$

$$\tan \varphi = \frac{-\sin \psi}{\frac{v_{ego}}{v_{obj}} - \cos \psi}$$

The above three relationships allow each intersecting angle ψ and each object velocity v_obj to be assigned exactly one collision-relevant relative velocity v_rad and one collision-relevant object angle φ using the firmly ascertained value of ego velocity v_ego.

Figure 4:
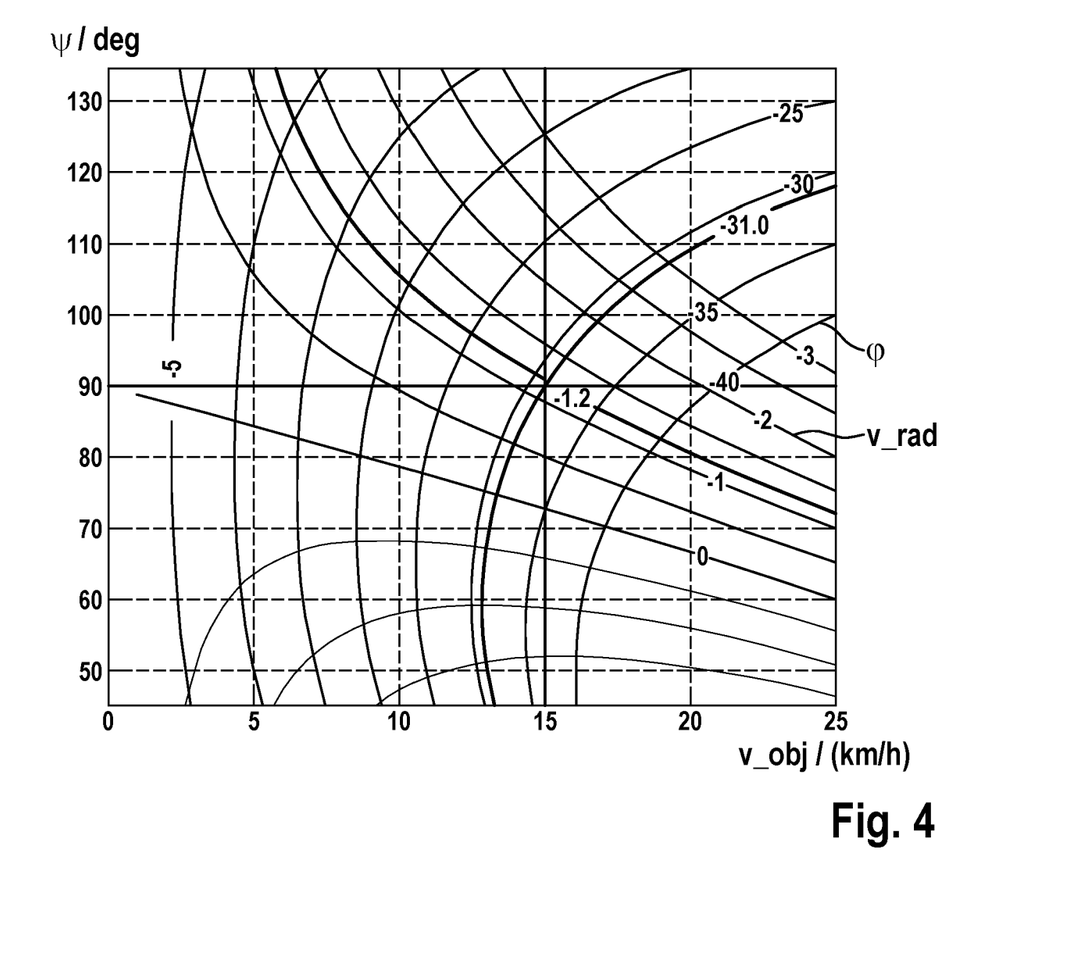
FIG. 4 shows relative velocities and object angles of an object as a function of the object velocity and of the intersecting angle between the respective trajectories.

FIG. 4, for example, illustrates the dependency of relative velocity v_rad and of object angle φ on intersecting angle ψ and of object velocity v_obj for an ego velocity v_ego of vehicle 8 of 25 km/h. For example, a perpendicularly intersecting trajectory, i.e., an intersecting angle ψ of 90 degrees at an object velocity v_obj of 15 km/h results in a relative velocity v_rad of −1.2 meters and an object angle φ of −31 degrees.

The collision-critical range is preferably expanded with the aid of tolerance ranges, so that the finite expansions of vehicle 8 and of object 4 are taken into consideration. In this case, it may be taken into consideration according to one specific embodiment that deviations in longer distances have lesser of an influence than in the case of shorter distances. Thus, the tolerance ranges and the collision-critical ranges may be a function of distance.

Returning to FIG. 1, detection unit 31 may limit the spectral range to be evaluated to those ranges that correspond to objects 4 having a negative relative velocity v_rad, since only such objects 4 are able to collide in the near future with vehicle 8.

Detection unit 31 may also limit the spectral range to relative velocities v_rad and object angles φ that satisfy the dependency discussed above. Object velocities v_obj and intersecting angles ψ remaining as parameters may be selected in particular, in predefined ranges. For example, it is possible to take only intersecting angles ψ into consideration that are smaller than predefined threshold values. Furthermore, objects 4 having object velocities v_obj, which are lower than a predefined threshold value, may be disregarded. Only objects 4, whose object velocity v_obj exceeds the predefined threshold value, are detected and evaluated.

Detection unit 31 detects objects within the limited collision-relevant spectral ranges of the radar data. While the evaluation below is described for one single object 4, detection unit 31 may also detect a plurality of objects 4 in parallel. Detection unit 31 ascertains relative velocity v_rad and object angle φ of object 4, in particular, based on the radar data. Multiple signal components may, for example, be detected as peaks in the spectrum and object angles φ may be determined based on separate DML angle estimations (deterministic maximum likelihood).

In the event detection unit 31 has detected an object 4, a tracking unit 32 ascertains a temporal course of relative velocity v_rad and of object angle φ of object 4.

An evaluation unit 33 is designed to determine whether the values of relative velocity v_rad and of object angle φ remain essentially constant. For this purpose, evaluation unit 33 may investigate whether an amount of a gradient of relative velocity v_rad and of the incident angle does not exceed respective threshold values. More generally, evaluation unit 33 is able to ascertain a degree of criticality or likelihood that relative velocity v_rad and object angle φ remain essentially constant, i.e., a collision with object 4 takes place. The degree of criticality may, in particular, be iteratively adapted based on new radar data.

Evaluation unit 33 may activate switching device 23 as a function of the calculated degree of criticality in order to select an appropriate antenna of antenna devices 21, 22.

Device 1 further includes a first calculating device 12 and a second calculating device 14. First calculating device 12 is designed to more precisely calculate and track a velocity, a distance and an object angle φ of object 4 based on the FMCW radar data. Second calculating device 14 is designed to carry out a pedestrian recognition based on the CW radar data by calculating a micro-Doppler effect. The results of the pedestrian recognition may be taken into consideration by first calculating device 12.

The device further includes an emergency braking unit 13, which is able to carry out an emergency braking as a function of the data ascertained by first calculating device 12. For this purpose, the degree of criticality generated by calculating device 33 may also be taken into consideration as a check for plausibility.

Figure 5:
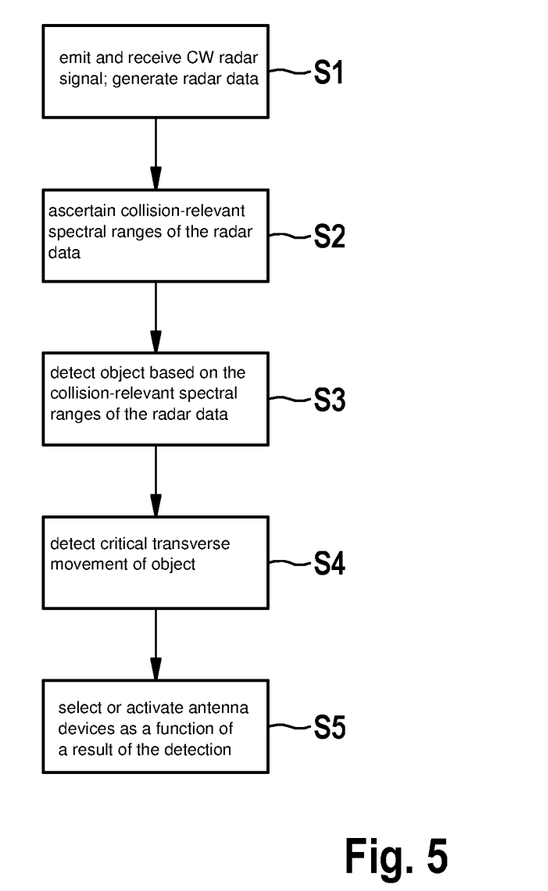
FIG. 5 shows a flow chart of a method for detecting critical transverse movements according to one specific embodiment of the present invention.

FIG. 5 illustrates a flow chart of a method for detecting critical transverse movements. The method may be carried out, in particular, by a device 1 described above.

In a method step S1, a CW radar signal is emitted and the reflected CW radar signal is received and radar data are generated. Radar device 2 used for this purpose may, as described above, include multiple antenna devices 21, 22 having different detection ranges 10, 11.

In method step S2, collision-relevant spectral ranges of the radar data are ascertained as a function of ego velocity v_ego of radar device 2. Relative velocity v_rad may, in particular, be limited to negative ranges. As described above, values or value ranges of relative velocities v_rad and corresponding object angles φ to be detected may also be limited, so that merely collision-critical situations are taken into consideration.

In method step S3, an object 4 is detected based on the collision-relevant spectral ranges of the radar data, and a time dependency of relative velocity v_rad and of object angle φ of object 4 is also ascertained.

In method step S4, a critical transverse movement of object 4 is detected using the time dependency of relative velocity v_rad and of object angle φ of object 4.

In an optional further method step S5, particular antenna devices 21, 22 may be selected or activated as a function of the result of the detection. In addition, an implementation of an emergency braking is possible, as described above.

What is claimed is:

1. A method for detecting critical transverse movements, comprising the following steps:
    emitting, by a radar device having one or more antenna devices, a continuous wave (CW) radar signal, which is not frequency-modulated, and generating, by the radar device, radar data based on a received reflected CW radar signal that has been generated by a reflection of the emitted CW radar signal;
    ascertaining a collision-relevant radar spectral range as a function of an ego velocity of the radar device;
    based on the ascertainment of the collision-relevant radar spectral range, performing an evaluation selectively of a portion of generated radar data that is determined to be within the ascertained collision-relevant radar spectral range, so that another portion of the generated data that is not within the ascertained collision-relevant radar spectral range is not subjected to the evaluation, wherein the evaluation ascertains, based on the generated radar data, a time dependency of a relative velocity of an object relative to the radar device and of an object angle of the object relative to the radar device;
    detecting a critical transverse movement of the object using the time dependency of the relative velocity of the object and of the object angle of the object; and
    in response to the detection, activating at least one of the one or more antenna devices to emit a frequency modulated continuous wave (FMCW) radar signal.

2. The method as recited in claim 1, wherein the one or more antenna devices include a plurality of antenna devices having detection ranges differing from one another.

3. The method as recited in claim 2, further comprising, subsequent to the activating, tracking the object based on a received reflected FMCW radar signal.

4. The method as recited in claim 1, wherein the radar device includes a plurality of receiver units, and the object angle is calculated based on phase differences of the reflected CW radar signal received by various ones of the receiver units.

5. The method as recited in claim 1, wherein the collision-relevant radar spectral range is determined in such a way that only objects having a negative relative velocity are considered.

6. The method as recited in claim 1, wherein the collision-relevant radar spectral range is determined under an assumption that the ego velocity of the radar device, the relative velocity of the object, and the object angle of the object, are constant.

7. The method as recited in claim 1, wherein collision-critical relative velocities and corresponding collision-critical object angles are determined as a function of the ego velocity of the radar device, of an intersecting angle between a trajectory of the object and a trajectory of the radar device, and of an object velocity of the object, and the collision-relevant radar spectral range is limited to those of the collision-critical ego velocities and collision-critical object angles, which correspond to the ego velocity of the radar device, to a predefined range of the intersecting angles, and to a predefined range of the object velocity.

8. The method as recited in claim 7, wherein the collision-critical relative velocities and collision-critical object angles are further determined taking finite expansions of the object and of a vehicle that includes the radar device, into consideration.

9. The method as recited in claim 1, wherein the critical transverse movement of the object is detected in an event relative changes of the relative velocity and of the object angle do not exceed predefined threshold values.

10. The method as recited in claim 1, wherein:
    the evaluation includes, based on (a) a determined angle of a trajectory of the object to a trajectory of the radar device and (b) a determined velocity of the object, determining at least one of:
        (a) a particular value of the relative velocity of the object relative to the radar device that is predefined as corresponding to a combination of the determined trajectory angle and the determined object velocity, and (b) a particular value of the object angle that is predefined as corresponding to the combination of the determined trajectory angle and the determined object velocity; and
    the detection of the critical transverse movement is made based on a determination of presence of a value that equals or is within a predefined range of the at least one of the particular value of the relative velocity of the object and the particular value of the object angle.

11. A device for detecting critical transverse movements, comprising:
    a radar device that includes one or more antenna devices, the radar device being configured to emit a continuous wave (CW) radar signal, which is not frequency-modulated, and to generate radar data based on a received reflected CW radar signal generated by a reflection of the emitted CW radar signal; and
    a computing device configured to:
        ascertain a collision-relevant radar spectral range as a function of an ego velocity of the radar device;
        based on the ascertainment of the collision-relevant radar spectral range, perform an evaluation selectively of a portion of generated radar data that is determined to be within the ascertained collision-relevant radar spectral range, so that another portion of the generated data that is not within the ascertained collision-relevant radar spectral range is not subjected to the evaluation, wherein the evaluation ascertains, based on the generated radar data, a time dependency of a relative velocity of an object relative to the radar device and of an object angle of the object relative to the radar device;

detect a critical transverse movement of the object using the time dependency of the relative velocity of the object and of the object angle of the object and in response to the detection, activate at least one of the one or more antenna devices to emit a frequency modulated continuous wave (FMCW) radar signal.

\* \* \* \* \*